(12) United States Patent
Durairaj et al.

(10) Patent No.: US 11,106,572 B2
(45) Date of Patent: Aug. 31, 2021

(54) PROGRESSIVE REGRESSION IMPACT MANAGEMENT FOR CODE CHANGES IN A COMPUTER PROGRAM

(71) Applicant: Dell Products L.P., Round Rock, TX (US)

(72) Inventors: Arockiaraj Durairaj, Bangalore (IN); Chetan Pudiyanda Somaiah, Bangalore (IN); Viswanath Krishnamurthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/732,810

(22) Filed: Jan. 2, 2020

(65) Prior Publication Data

US 2021/0209010 A1  Jul. 8, 2021

(51) Int. Cl.
*G06F 11/36* (2006.01)
*G06F 8/70* (2018.01)

(52) U.S. Cl.
CPC ............ *G06F 11/3688* (2013.01); *G06F 8/70* (2013.01); *G06F 11/368* (2013.01); *G06F 11/3692* (2013.01)

(58) Field of Classification Search
CPC ............ G06F 11/3688; G06F 11/3668; G06F 11/3692; G06F 11/079; G06F 11/70
See application file for complete search history.

(56) References Cited

U.S. PATENT DOCUMENTS

| | | | | |
|---|---|---|---|---|
| 10,503,632 | B1* | 12/2019 | Sivanantham | G06F 11/3688 |
| 10,635,432 | B2* | 4/2020 | Somani | G06F 8/71 |
| 2017/0235661 | A1* | 8/2017 | Liu | G06F 11/3688 |
| | | | | 717/106 |

OTHER PUBLICATIONS

Fernanda M. Delfim et al., Visual approach for change impact analysis: a controlled experiment, IEEE, 2015, retrieved online on Jun. 18, 2021, pp. 391-396. Retrieved from the Internet: <URL: https://ieeexplore.ieee.org/stamp/stamp.jsp?tp=&arnumber=7113504>. (Year: 2015).*

P. Varhol, "A New Approach to Testing SAAS Enterprise Applications," TestCraft, https://www.testcraft.io/new-approach-testing-saas-enterprise/, Dec. 13, 2018, 3 pages.

* cited by examiner

*Primary Examiner* — Hanh Thi-Minh Bui
(74) *Attorney, Agent, or Firm* — Ryan, Mason & Lewis, LLP

(57) ABSTRACT

At least one processing platform is configured to automatically analyze one or more code changes in a computer program and at least one of modify and create a set of one or more regression tests for the computer program based on the automatic analysis. The one or more code changes automatically analyzed may comprise one or more incremental code changes in the computer program.

20 Claims, 13 Drawing Sheets

100

200

300

400

800

1000

PROGRESSIVE REGRESSION IMPACT MANAGEMENT FOR CODE CHANGES IN A COMPUTER PROGRAM

FIELD

The field relates generally to computer program development, and more particularly to techniques for regression testing management of computer programs.

BACKGROUND

An important phase of the development lifecycle of a computer program, also referred to interchangeably herein as software or application, is regression testing. Regression testing is a type of software testing used to confirm that a change to program code of the software has not adversely affected existing functionalities (features) of the software. For example, regression testing may typically include re-execution of one or more previously executed tests (i.e., first executed prior to the program code change) to ensure existing functionalities still perform as desired. Such tests, also referred to as test cases, may collectively be referred to as a regression test suite.

One computing environment in which software regression testing is typically employed is an enterprise computing environment. An enterprise computing environment is a computing environment associated with a company that develops and/or purchases software that is executed in the computing environment for purposes of clients of the enterprise which can include, but are not limited to, employees and/or customers of the enterprise. As the computing environment grows, it becomes extremely challenging to continuously upgrade regression suites to match with the velocity of the software delivery cycle. Time to market (i.e., how quickly a new or updated software product is released for production use by clients) is a critical focus for large enterprises. Thus, efficiently carrying out regression testing along with new feature testing before deploying the software for production use is critical. This demands that the regression test suite be continuously updated by retiring obsolete test cases and appending new test cases to match the delivery velocity. Updating the regression test suite is typically performed manually based on subject matter expert recommendations and, as such, presents significant challenges. For example, manual analysis and update leads to critical scenario misses, and the volume of regression grows significantly over time.

SUMMARY

Embodiments of the invention provide techniques for improved regression testing management and, more particularly, methodology to identify relevant regression test cases on impacted areas in incremental code changes.

For example, in one embodiment, an apparatus comprises at least one processing platform comprising one or more processing devices. The at least one processing platform is configured to automatically analyze one or more code changes in a computer program and at least one of modify and create a set of one or more regression tests for the computer program based on the automatic analysis. The one or more code changes automatically analyzed may comprise one or more incremental code changes in the computer program. Modifying and/or creating a set of one or more regression tests may further comprise identifying one or more relevant regression test cases associated with one or more impacted areas of the computer program based on the one or more incremental code changes, and automatically modifying existing test cases and/or creating new test cases to address the code changes.

Advantageously, illustrative embodiments provide an automated methodology to identify and resolve code change impacts at a root-level with respect to a regression test suite. Further, illustrative embodiments provide an intelligent framework configured to analyze incremental code changes on impacted modules to create a dynamic regression test suite with improved precision. Still further, illustrative embodiments provide a scientific methodology to evaluate and gap-fit a regression suite based on the ongoing code changes. Enterprise systems with complex integrations may, for example, adopt one or more of these methodologies and framework to ensure the regression of end-to-end scenarios is addressed.

These and other features and advantages of the invention will become more readily apparent from the accompanying drawings and the following detailed description.

DETAILED DESCRIPTION

Illustrative embodiments may be described herein with reference to exemplary computing environments such as, but not limited to, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "computing environment," "cloud environment," "cloud computing platform," "cloud infrastructure," "data repository," "data center," "data processing system," "computing system," "data storage system," "information processing system," and the like as used herein are intended to be broadly construed, so as to encompass, for example, any arrangement of one or more processing devices.

Figure 1:
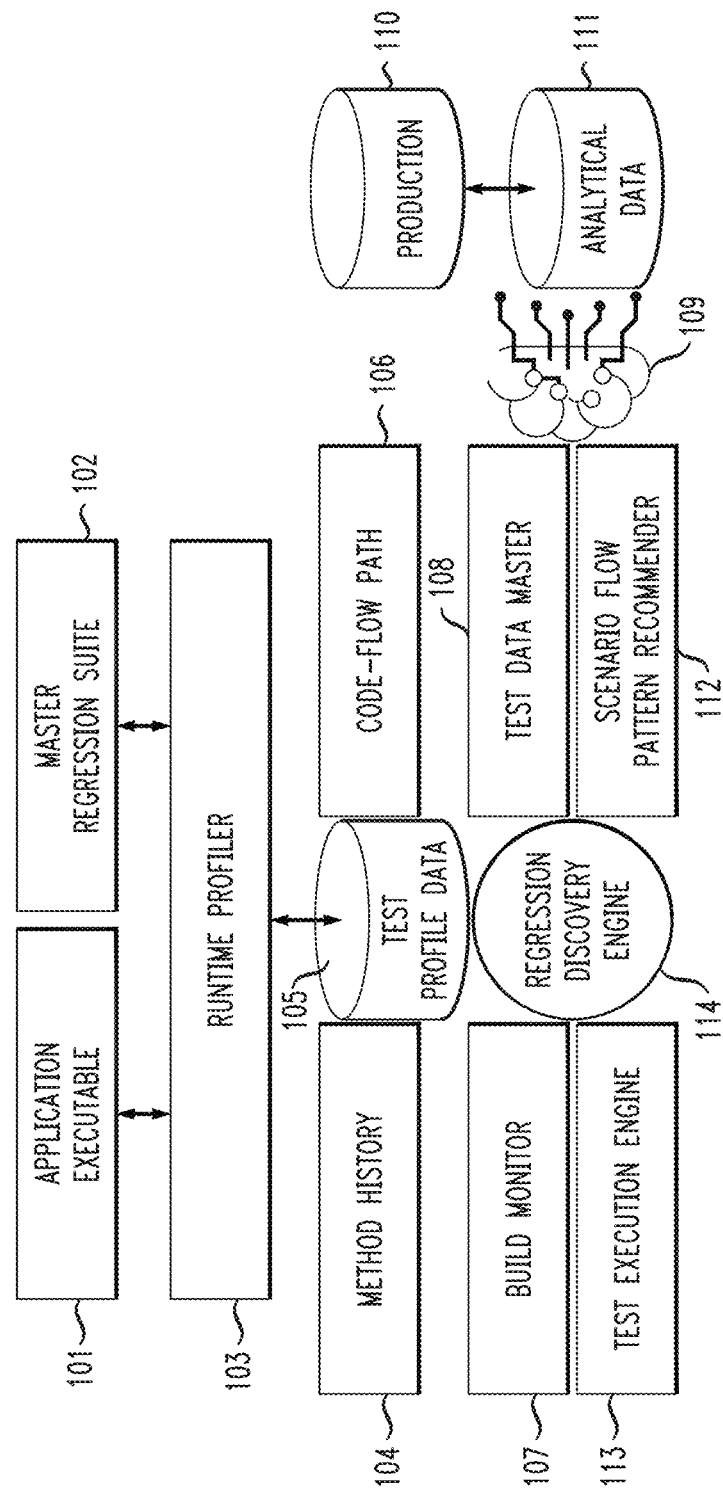
FIG. 1 depicts a computing environment for progressive regression impact management, according to an illustrative embodiment.

As mentioned above, illustrative embodiments provide an intelligent framework configured to analyze code changes and their impact in order to create a dynamic regression test suite with improved precision. FIG. 1 depicts an illustrative embodiment of such an intelligent framework.

More particularly, FIG. 1 depicts a computing environment 100 for progressive regression impact management, according to an illustrative embodiment. As shown, computing environment 100 comprises an application executable 101, a master regression suite 102, a runtime profiler 103, a method history module 104, a test profile data store 105, a code-flow path module 106, a build monitor module 107, a test data master 108, a network 109, a production store 110, an analytical data store 111, a scenario flow pattern recommender 112, a test execution engine 113, and a regression discovery engine 114. The interrelationship between the components in computing environment 100 will be explained further herein.

The application executable 101 is the portion or entirety of the application (software, computer program) which is undergoing regression testing. The master regression suite 102 is the set of test cases (tests) used to test functionalities of the application executable 101. During testing, as the application executable 101 executes, the runtime profiler 103 executes one or more of the tests of the master regression suite 102. It is assumed that test profile data is collected in data store 105 which includes, inter alia, method history information 104 and code-flow path information 106. That is, the runtime profiler 103 monitors and collects data about how the application executes during each test case of the master regression suite 102 that is run. For instance, assume that the application executable 101 comprises a plurality of methods (e.g., functions that the code of the application performs). As the application executable 101 executes during testing, the runtime profiler 103 stores, in data store 105, information 104 describing which methods executed, as well as code-flow path information 106 which indicates what specific parts of the code of the application executable 101 were invoked and run (and the order in which they were run) during each test case. Further, the test case results can be stored in data store 105 as well.

Now assume that one or more changes are made to one or more methods of the application executable 101. For example, these changes may be updates such as, but not limited to, functionality upgrades, performance upgrades and/or bug fixes. The runtime profiler 103 monitors and collects information 104 and 106, as mentioned above, for the updated version of application executable 101 as one or more tests of the master regression suite 102 are performed. The updated test case results can be stored in data store 105 as well. Then, an analysis on the test results is performed to confirm that the application executable 101 executes in an acceptable manner following the updates (note that what is acceptable and/or appropriate, sufficient, expected, desired, etc. depends on the nature of the application being regression tested, e.g., confirmation can be made that the application still conforms with performance terms specified in a service level agreement). More particularly, by performing a given test of the master regression suite 102 before the code change and then after the code change, a comparison of the respective test results can be made to confirm that one or more particular functionalities tested by the test still operate as desired/required (as noted above) after the code change.

However, assume that the changes made to the application executable 101 include one or more changes that are not covered by one or more tests of the master regression suite 102, i.e., there is a gap in the regression testing. For example, perhaps the code change added an entirely new functionality to the application or otherwise changed an existing functionality. In such a scenario(s), the updated version of the application executable 101 will not be satisfactorily tested, thus enabling regression. As such, an update to the master regression suite 102 is needed. However, in existing regression testing environments, the identification of a gap in testing is typically done manually by a developer or some other individual. As mentioned in the background section above, such manual effort can be time consuming and can miss significant changes that should be tested.

To address these and other issues, regression discovery engine 114 automatically detects one or more code changes to the application executable 101, evaluates the one or more code changes, and determines any gaps in the master regression test suite 102. In one or more illustrative embodiments, a code change is detected by engine 114 based on knowledge of the method history 104 and/or other information from test profile data store 105.

As will be further explained, the regression discovery engine 114 is also configured to automatically update the master regression suite 102 to include one or more additional tests and/or one or more changes to one or more existing tests in the suite. Then, the code change is tested by the runtime profiler 103 using the one or more additional tests and/or the one or more changes to one or more existing tests in the master regression suite 102. However, before determining any new or modified test cases to be added to the master regression suite, regression discovery engine 114 utilizes test data 108 and test execution engine 113 to enable scenario flow pattern recommender 112 to generate one or more scenario flow pattern recommendations. As will be further explained herein, once a gap is determined in the regression testing scheme, regression discovery engine 114 determines one or more proposed paths through one or more methods of the application executable 101 for a test case to flow. Build monitor module 107 can be used to visualize the test data and scenario flow patterns that are generated.

Further, in order to determine which recommendation from the one or more recommendations output by scenario flow pattern recommender 112 is appropriate, the production system where the application executable 101 is run in real-time (online) is accessed. It is to be understood that regression testing is typically done offline, i.e., not on the production system but rather on a backup or protection system. As shown in FIG. 1., production application data is accessed through network 109. In one or more embodiments, test data master 108 comes from production data. Analytics are performed by considering the recommendations from recommender 112 in view of production application data in production store 110, and results of the analytics are stored in analytical data store 111. For example, a prescript analysis tools can be used to call out which are the high volume and high revenue data based on a historical data set. Test profile data leverages these high volume and high revenue data during execution of the profile. In one example, production data for the previous three years can be input to a decision tree algorithm to identify a high volume and high revenue data set from production data.

If there are any deficiencies determined as a result of the analytics, the regression discovery engine 114 is notified, and new or updated recommendations for one or more test cases/flow paths can be made and re-evaluated. Thus, the regression discovery engine 114 can iterate as often as needed to come up with the appropriate test cases to update the master regression suite 102 until any gaps in the regression testing are addressed for any incremental code changes. As such, regression impact discovery as described herein is considered "progressive" in the sense that regression gap discovery and correction occur incrementally and dynamically, i.e., correction continuously occurs each time a code change is detected).

Once a flow path(s) for a new or modified test case(s) to address one or more gaps in the regression testing is selected based on this analysis, the master regression suite 102 is updated by the regression discovery engine 114 with the new or modified test case(s).

Figure 2:
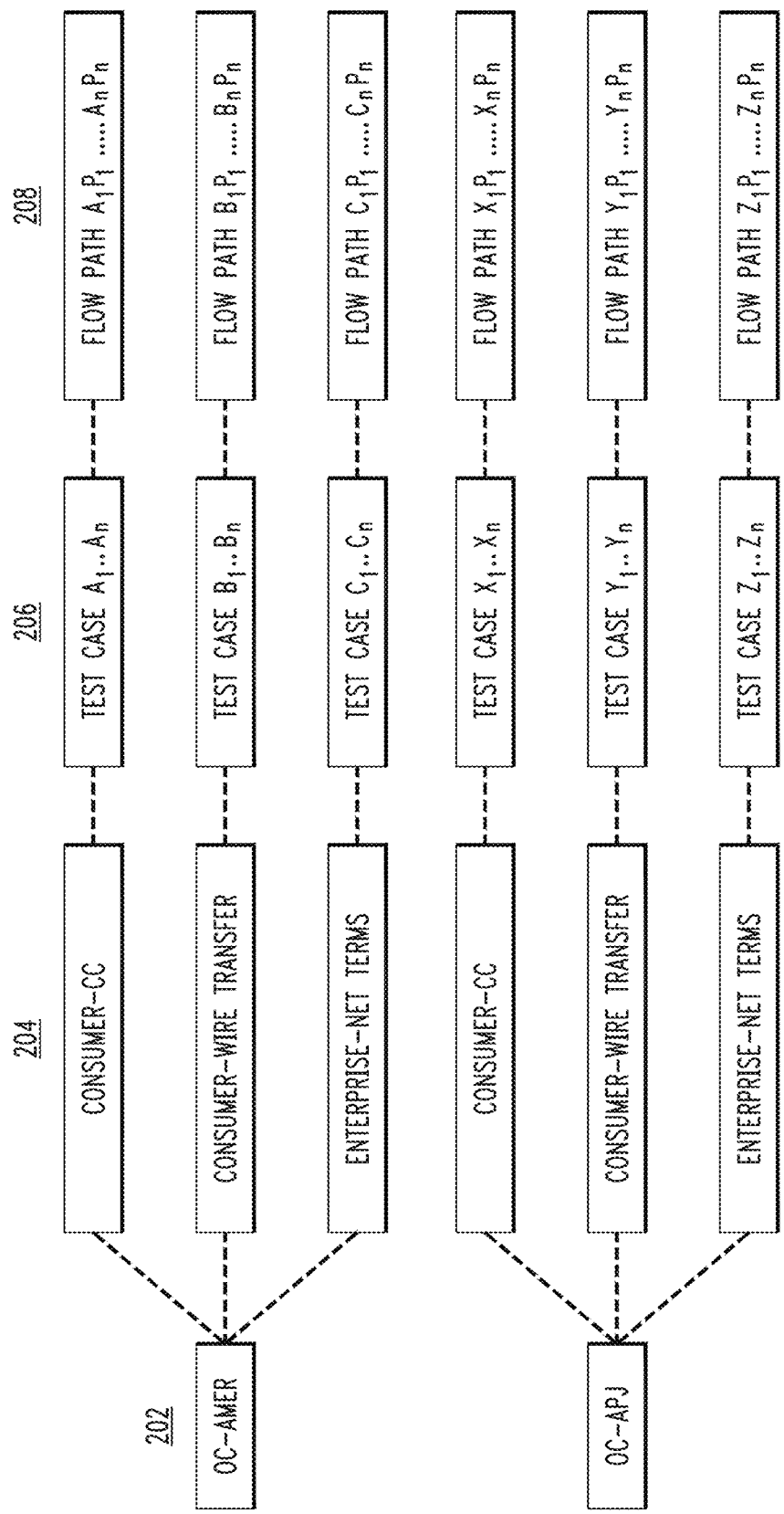
FIG. 2 depicts an example of a base regression suite, according to an illustrative embodiment.

FIG. 2 depicts an example 200 of a base regression suite, according to an illustrative embodiment. More particularly, the base regression suite depicted in example 200 in FIG. 2 represents an example of master regression suite 102 in FIG. 1. Assume that the application being regression tested is designed to manage payment transactions and related issues for customer purchases of products associated with a globally distributed enterprise. Such an example is not intended to be limiting in scope with respect to embodiments covered herein.

As shown, assume that the enterprise has two geographic regions of interest with which the application (application executable 101) is associated, e.g., Asia Pacific/Japan (APJ) and America (AMER). These regions are collectively depicted in FIG. 2 as 202. Note that the application has various methods (e.g., functions that the code of the application performs) coded therein for different functions associated with each region. For example, collectively depicted as 204, each region has a method that manages particular types of consumer credit cards (CONSUMER—CC), a method that manages particular types of consumer wire transfers (CONSUMER—WIRE TRANSFER), and a method that manages particular net terms of the enterprise (ENTERPRISE-NET TERMS). In this example 200, each method has a set of one or more test cases associated therewith (collectively depicted as 206), and each set of one or more test cases has a set of one or more code flow paths associated therewith (collectively depicted as 208). Thus, for example, for a consumer wire transfer in the APJ region, the base regression suite in FIG. 2 includes a TEST CASE (set) $Y_1 \ldots Y_n$ with FLOW PATH (set) $Y_1P_1 \ldots Y_nP_n$. Again, recall that a flow path (or pattern) is a traversal path through the code of the application associated with execution of a given regression test case, i.e., the sequence of code instructions of the application that are called and otherwise executed for the given test.

Further assume that a code change to the application adds a new type of consumer payment transaction not covered by the test cases 206 in FIG. 2. The base regression suite in FIG. 2 would therefore have a testing gap since it does not test for the new type of consumer payment transaction. Illustrative embodiments automatically identify this gap and provide for updating the base regression suite to include a test case for the new type of consumer payment transaction.

Figure 3:
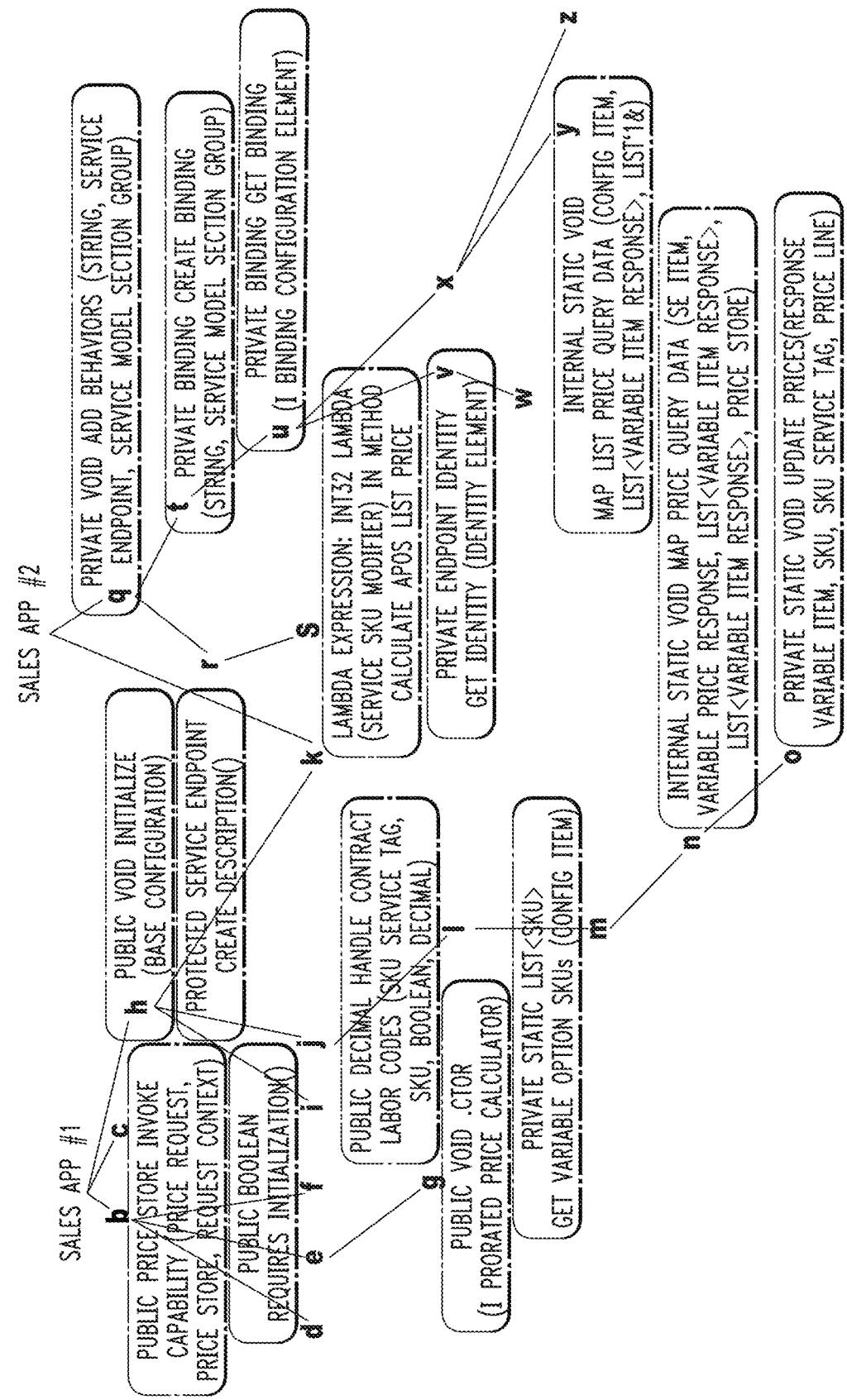
FIG. 3 depicts an example of a code flow in a call graph tree, according to an illustrative embodiment.

FIG. 3 depicts an example 300 of a code flow in a call graph tree, according to an illustrative embodiment. It is to be understood that the execution of a given application may call one or more other applications. Thus, it is to be understood that improved regression management techniques described herein can also be applied to the execution and testing of more than one application at a time. Example flow 300 shows interaction between two sales applications (Sales App #1 and Sales App #2). In general, the various nodes (bubbles) of the call graph tree in example 300 represent different parts of methods (functions) that constitute the applications. The letters (a through z) in the graph are referred to as "touchpoints" and simply illustrate the operational sequence of flow or traversal (call flow path) through the applications.

Figure 4:
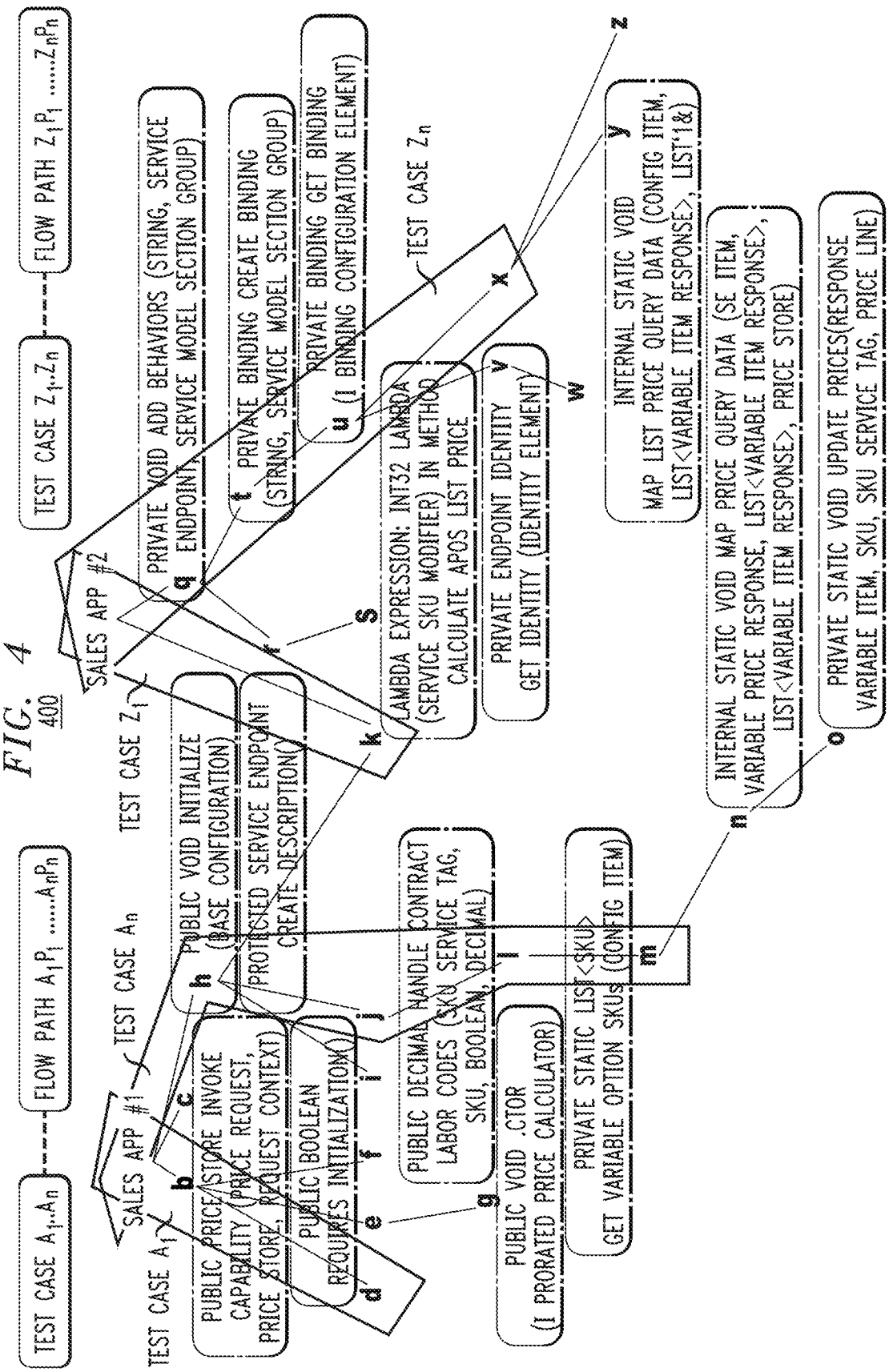
FIG. 4 depicts an example of test cases identified in a call graph tree, according to an illustrative embodiment.

Turning now to FIG. 4, an example 400 is depicted of test cases identified in the call graph tree in example 300 of FIG. 3. More particularly, as shown, test cases $A_1$, $A_n$, $Z_1$ and $Z_n$ are depicted as respective rectangles around the flow paths (functions and/or touchpoints) that the test cases traverse during execution. For example, TEST CASE $Z_n$ includes touchpoints q, t, u and x.

Note that examples 300 and 400 in FIGS. 3 and 4, respectively, are merely intended to illustrate the notion of test cases and flow paths, and should be understood not to limit the improved regression testing management techniques described herein.

Recall the running example of an application being regression tested that is designed to manage payment transactions and related issues for customer purchases of products associated with a globally distributed enterprise. Assume that a code change to the application may, for example, add a new type of consumer payment transaction not covered by the existing tests in the base regression suite. The base regression suite would therefore have a testing gap since it does not test for the new type of consumer payment transaction, and illustrative embodiments automatically identify this gap and provide for updating the base regression suite to include a test case for the new type of consumer payment transaction. In some embodiments, more than one code change is presented, and can be handled separately as developer builds ("builds"). For example, a first change to the application and thus the regression suite may be referred to as "Build I," while a second change to the application and thus the regression suite is referred to as "Build II." Separate builds can be combined into a composite build. Alternatively, the application and thus the base regression suite, prior to any code change, can be Build I, while Build II refers to the build after one or more code changes.

Figure 5:
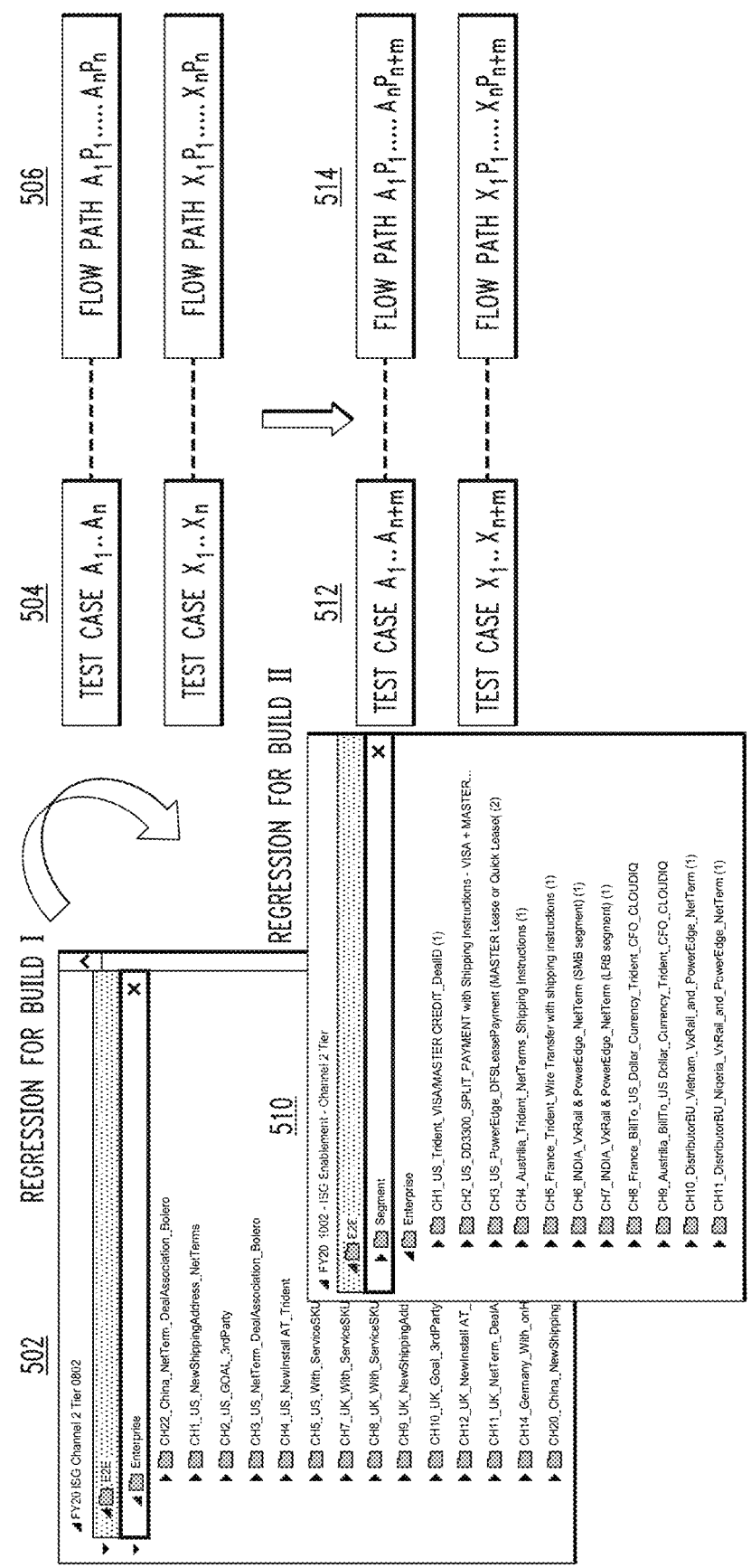
FIG. 5 depicts an example of multiple regression testing builds, according to an illustrative embodiment.

FIG. 5 depicts an example 500 that represents two versions of a regression suite, referenced as Build I and Build II. Listing 502 illustrates a grouping of functions or methods (designated as "CH #") associated with a version of the given application associated with a first set of code changes, i.e., Build I. The test cases for Build I are collectively denoted as 504 and the corresponding flow paths are collectively denoted as 506. Listing 510 illustrates a grouping of functions or methods (also designated as channels or "CH #") associated with a version of the given application associated with a second set of code changes, i.e., Build II. The test cases for Build II are collectively denoted as 512 and the corresponding flow paths are collectively denoted as 514.

Figure 6:
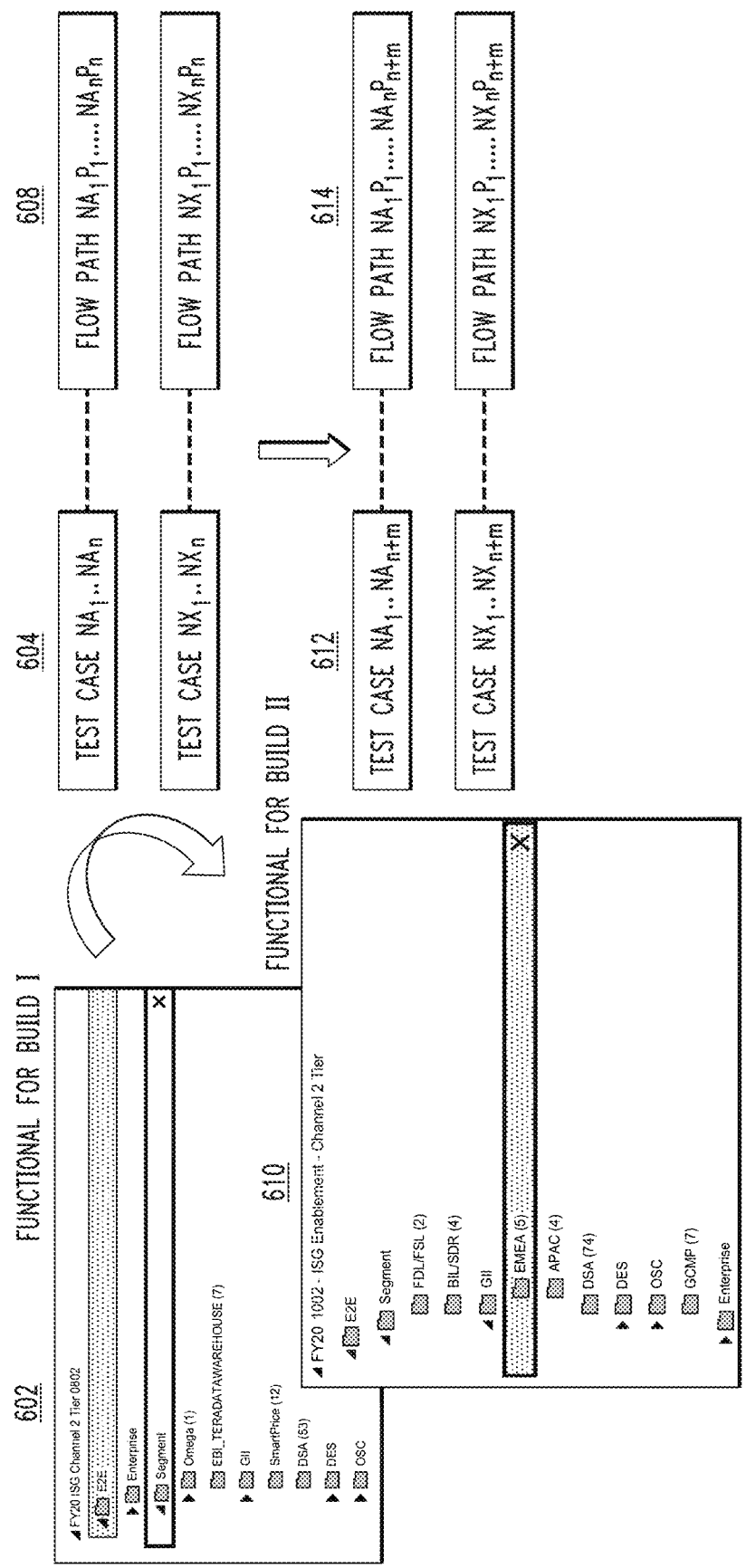
FIG. 6 depicts an example of test profile data, according to an illustrative embodiment.

When code changes are made, the impacted areas of code are referred to as "functionals." FIG. 6 depicts an example 600 that represents functionals associated with two versions of a regression suite, referenced as Build I and Build II. Listing 602 illustrates a grouping of impacted functions or methods associated with a version of the given application associated with a first set of code changes, i.e., Build I. The test cases for Build I are collectively denoted as 604 and the corresponding flow paths are collectively denoted as 608. Listing 610 illustrates a grouping of impacted functions or methods associated with a version of the given application associated with a second set of code changes, i.e., Build II. The test cases for Build II are collectively denoted as 612 and the corresponding flow paths are collectively denoted as 614.

Figure 7:
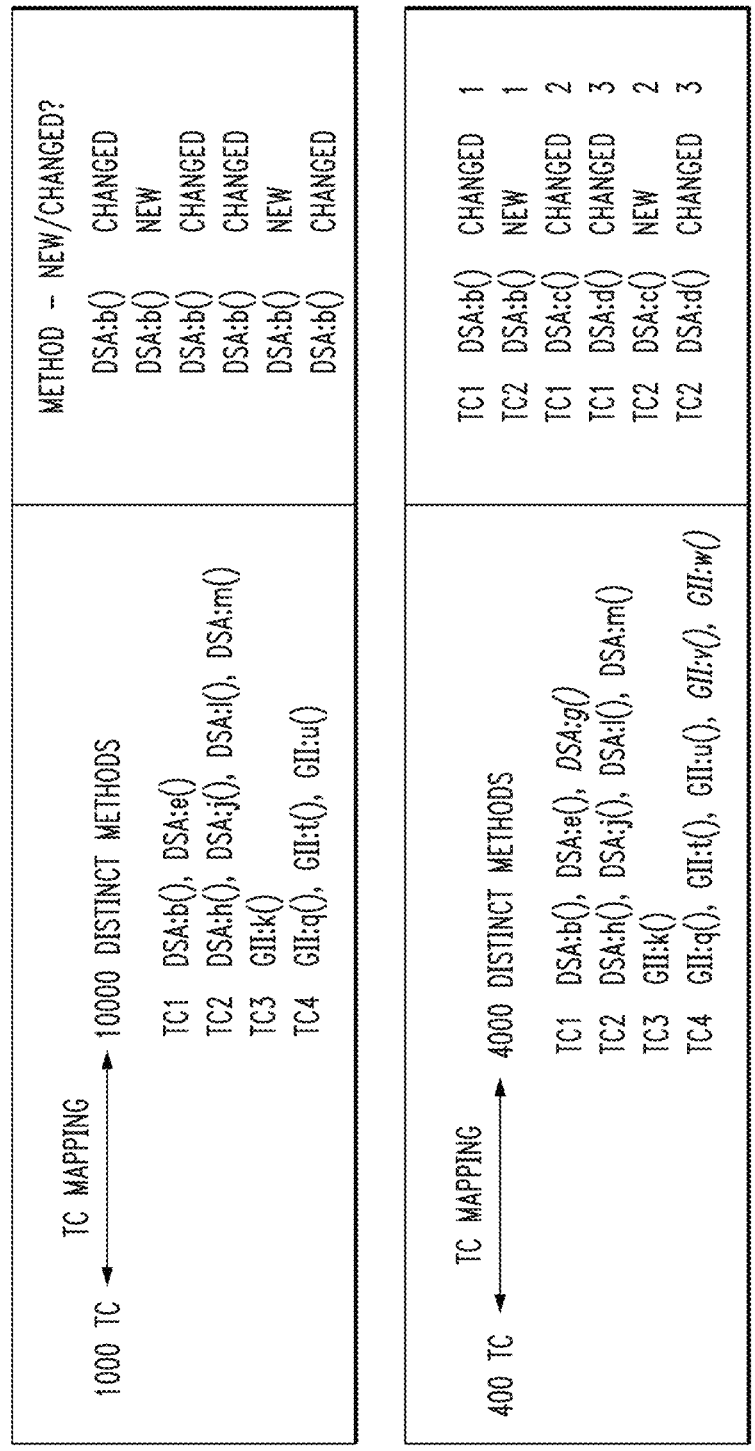
FIG. 7 depicts an example of test case mapping, according to an illustrative embodiment.

Given the example builds and functionals mentioned above in the context of FIGS. 5 and 6, FIG. 7 depicts an example 700 of test case mapping, according to an illustrative embodiment. More particularly, test case mapping 710 refers to a first set of code changes (Build I) while test case mapping 720 refers to a second set of code changes (Build II). Thus, in test case mapping 710, the regression discovery engine 114 obtains a mapping of 1000 test cases to 10,000 methods (functions) of the given application. Assume that the given application is referred to as DSA (e.g., an enterprise sales application), then it is to be understood that a given test case is mapped to one or more methods, e.g., as shown, TC1 maps to two distinct methods DSA:b( ) and DSA:e( ). Similarly, in test case mapping 720, the regression discovery engine 114 obtains a mapping of 400 test cases to 4,000 methods (functions) of the given application. Note that in test case mapping 720, it is assumed that methods of another sales application (GII), along with sales application DSA, are impacted by a set of code changes, e.g., as shown, TC4 maps to methods GII:q( ), GII:t( ), GII:u( ), GII:v( ) and GII:w( ). Impacted methods are depicted in italics. Note that, in this example, DSA:b( ) is shown changing and new, and indicates if there is change to an existing class or an addition of new class into the DSA:b( ) method. The numbers (1, 1, 2, 3, 2, 3) listed on the right side of test case mapping 720 indicates the number of changes made to the class which is part of the method.

Figure 8:
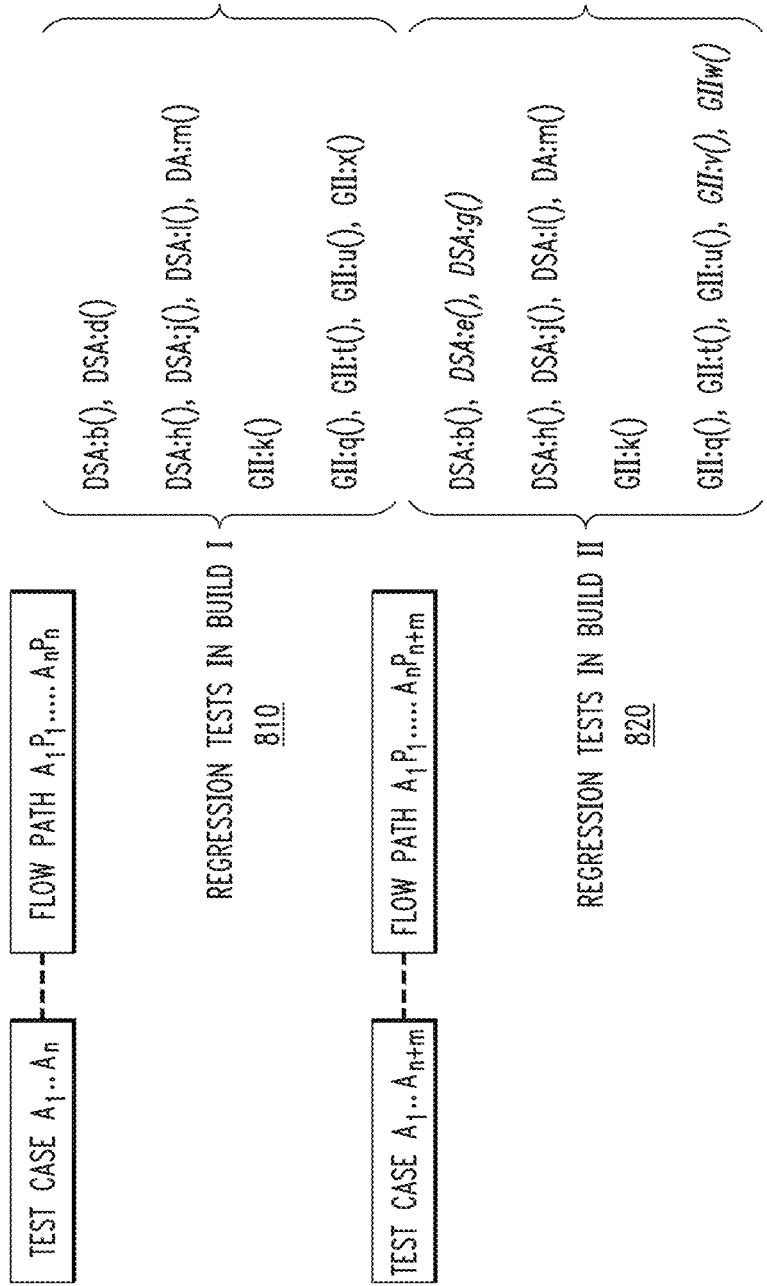
FIG. 8 depicts an example of code flow paths, according to an illustrative embodiment.

In accordance with test case mappings, regression discovery engine 114 discovers the code changes between the two builds and, in response, creates new test cases and modifies existing test cases, as explained in detail above. Then, corresponding code flow paths are identified for the new and modified test cases. FIG. 8 depicts an example 800 of code flow paths associated with two separate builds. More particularly, code flow path 810 is associated with regression tests in Build I, while code flow path 820 is associated with regression tests in Build II. Impacted methods are depicted in italics. Again, it is to be noted that these code flow paths are merely examples and not intended to be limit the embodiments covered herein.

Figure 9:
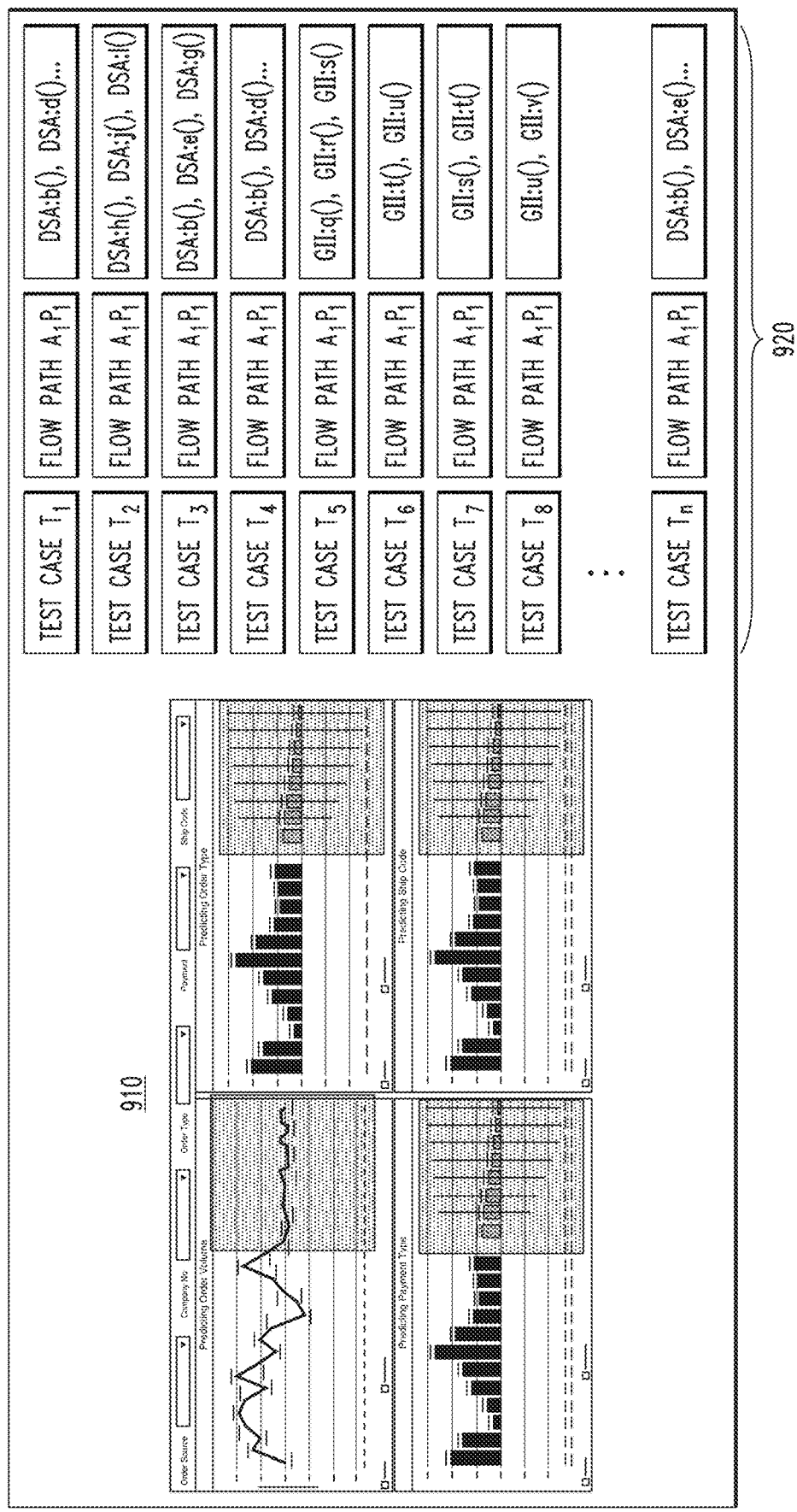
FIG. 9 depicts an example of a monitor build, according to an illustrative embodiment.

FIG. 9 depicts an example 900 of a monitor build, according to an illustrative embodiment. Recall that build monitor module 107 (FIG. 1) is used to visualize test data and scenario flow paths (patterns). As shown in example 900, module 107 of the progressive regression impact management system generates graphs 910 based on corresponding test cases and code flow paths 920. The graphs 910 enable an administrator to see what test cases are impacted based on code changes. These predictions in the graphs depict trends and are determined from analytics results 111 performed on production data 110 (recall from FIG. 1 description above).

Figure 10:
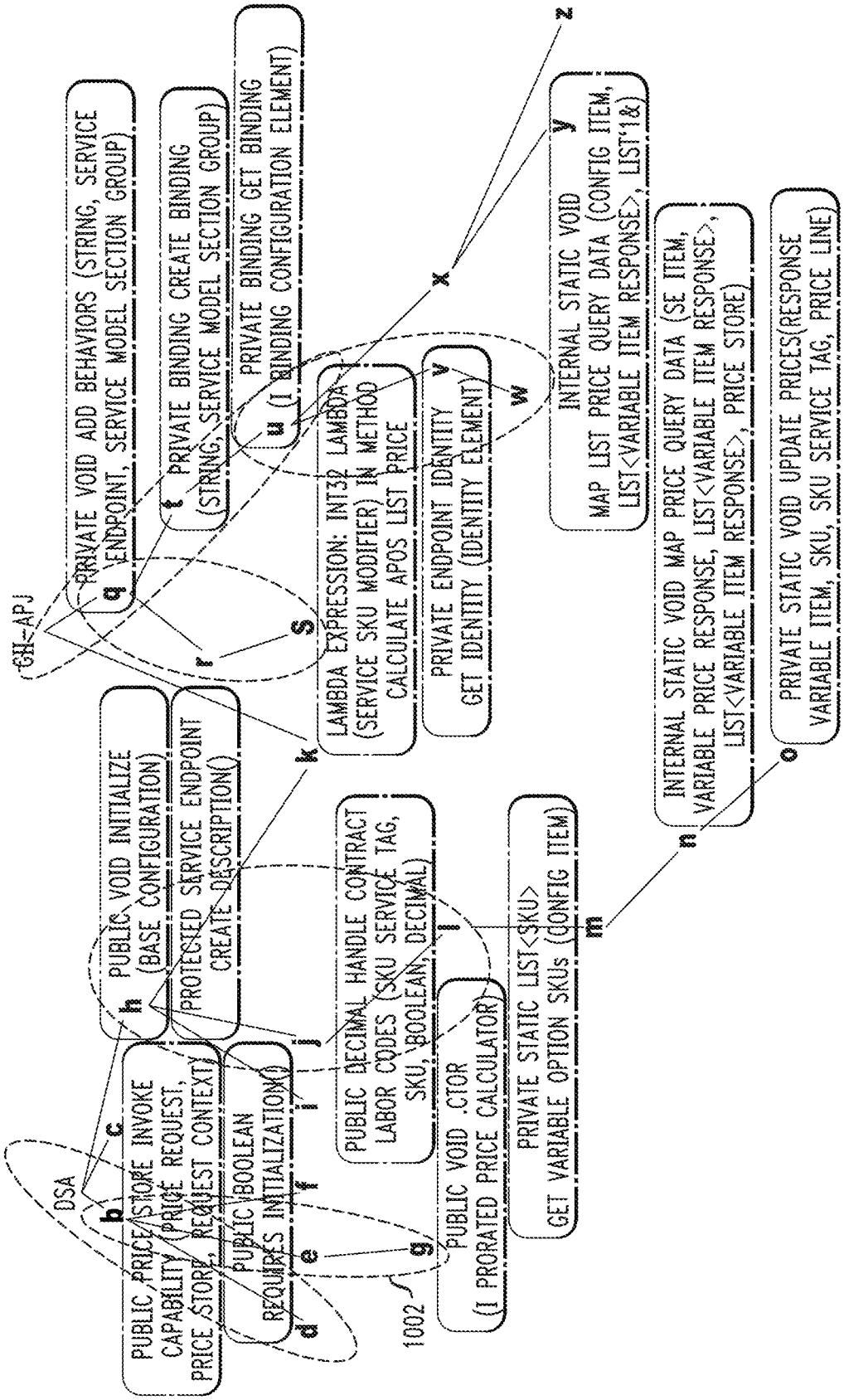
FIG. 10 depicts an example of code flow in a call graph after code changes are discovered and accounted for, according to an illustrative embodiment.

FIG. 10 depicts an example 1000 of code flow in a call graph after code changes are discovered and accounted for, according to an illustrative embodiment. More particularly, example 1000 shows changes to the test cases shown in example 400 of FIG. 4 after the code changes have been discovered and the regression suite has been updated to account for the code changes. Note that in comparison to FIG. 4, there are new and modified test cases (touchpoints encircled by dashed lines) in FIG. 10. By way of example only, test case 1002 corresponding to touchpoints b, e and g has been added. Note that examples 400 and 1000 in FIGS. 4 and 10, respectively, are merely intended to illustrate the notion of test cases and flow paths, and should be understood not to limit the improved regression testing management techniques described herein.

Figure 11:
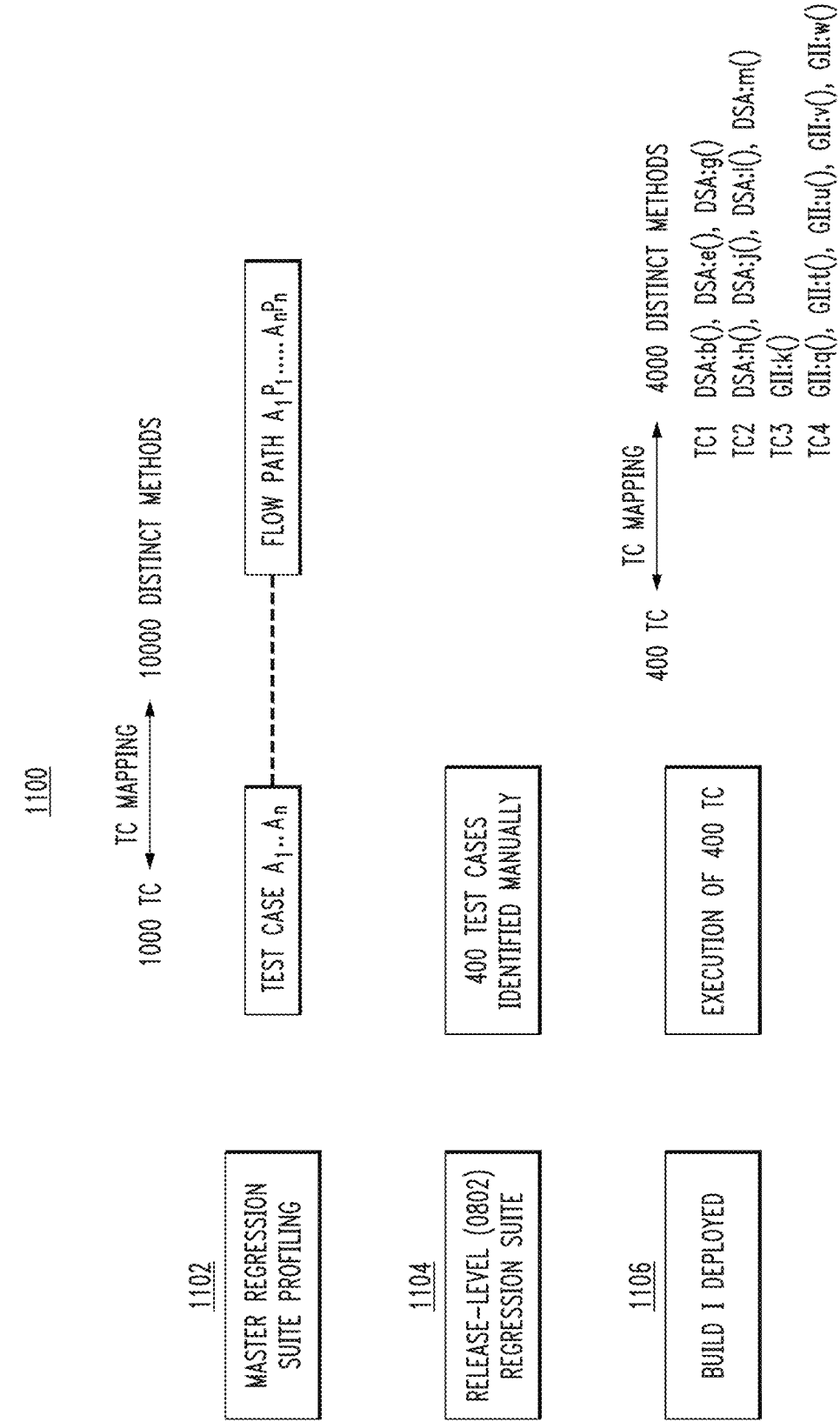
FIG. 11 depicts manual test case impact discovery.

FIG. 11 depicts manual test case impact discovery 1100 for a given application. As shown, in step 1102, master regression suite profiling occurs wherein the test cases (1000 TC) are mapped to the methods (10,000 methods). Then, in step 1104, test cases impacted by a set of code changes to the application are manually identified. Lastly, in step 1106, the impacted test cases are modified and/or other new test cases added to the regression suite.

Figure 12:
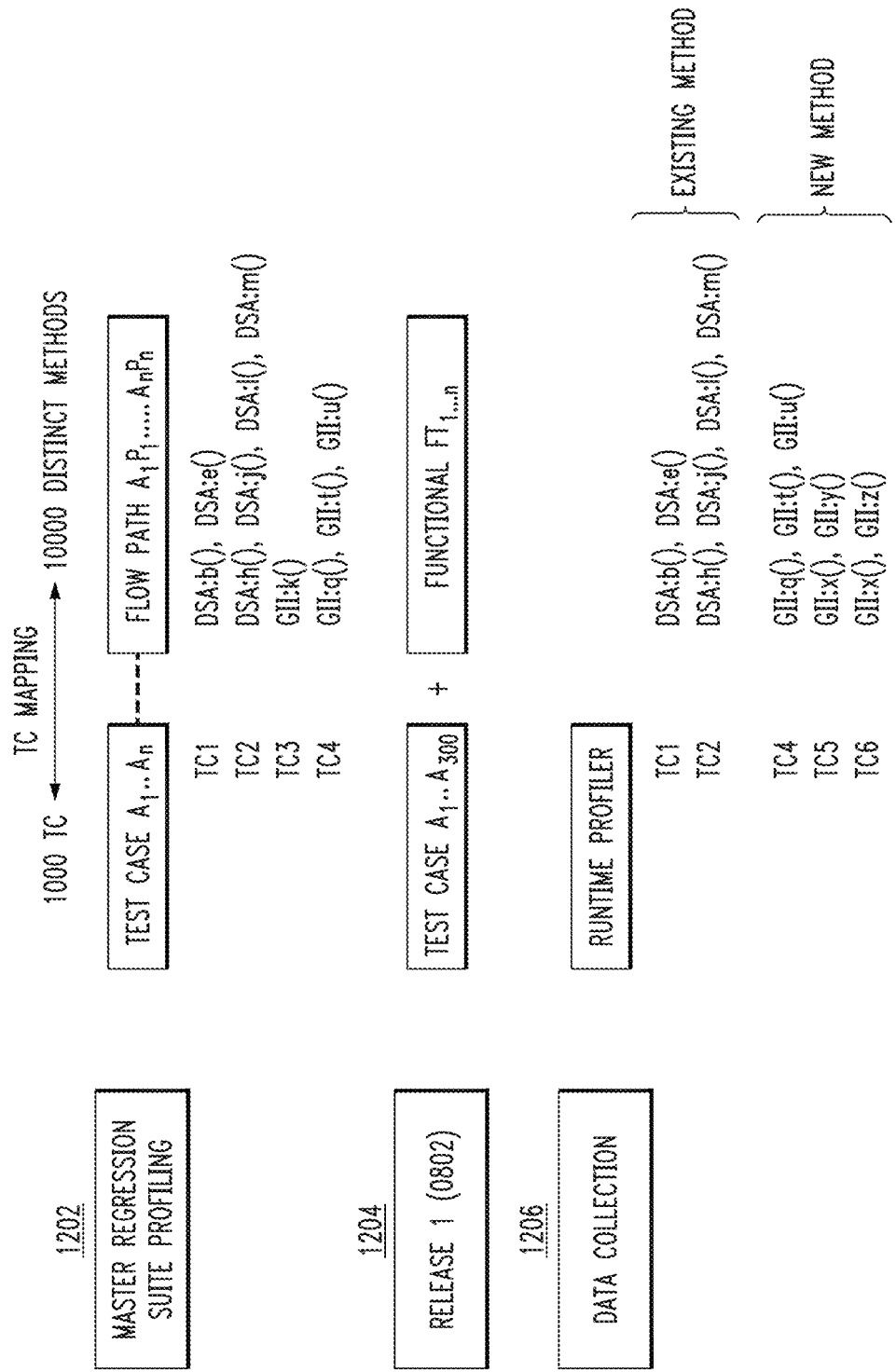
FIGS. 12 and 13 depict operations associated with progressive regression impact management, according to an illustrative embodiment.
Figure 13:
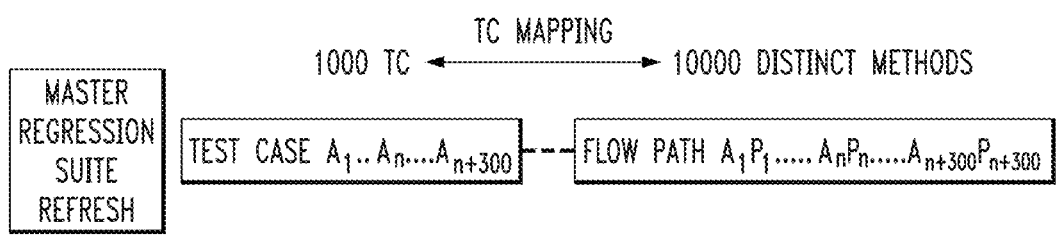

FIGS. 12 and 13 depict operations associated with progressive regression impact management, according to an illustrative embodiment. As shown in FIG. 12, in step 1202, master regression suite profiling occurs wherein the test cases (1000 TC) are mapped to the methods (10,000 methods). In step 1204, all test cases and the code change functionals are considered by the system. Using the progressive regression impact management techniques described herein, the test cases impacted by the set of code changes to the application are automatically identified in step 1206. Lastly, in step 1300 of FIG. 13, the master regression suite is updated (refreshed) to reflect the new and/or modified test cases and their corresponding code flow paths.

Figure 14:
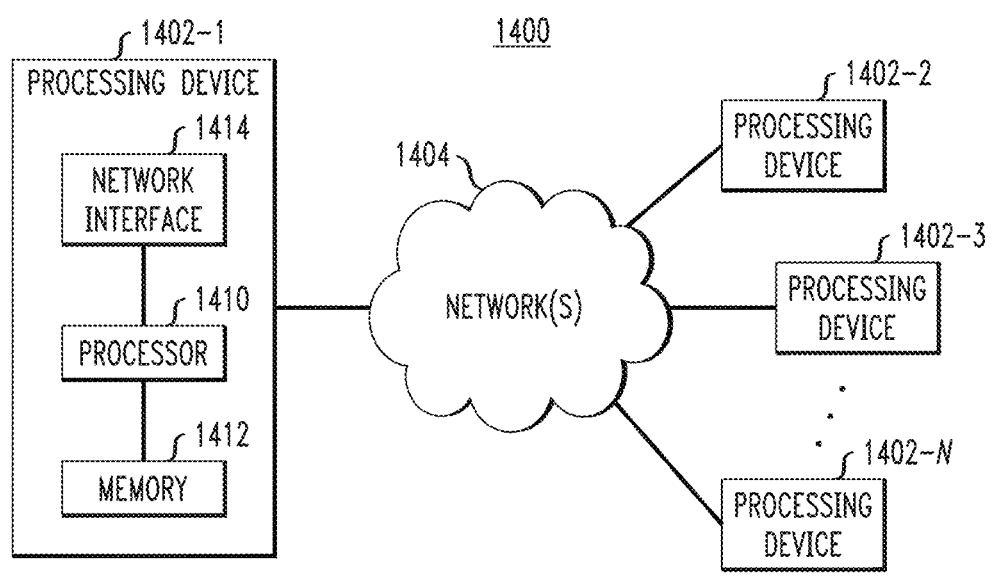
FIG. 14 depicts a processing platform used to implement a computing environment with progressive regression impact management, according to an illustrative embodiment.

FIG. 14 depicts a processing platform 1400 used to implement progressive regression impact management, according to an illustrative embodiment. More particularly, processing platform 1400 is a processing platform on which a computing environment with functionalities described herein (e.g., FIGS. 1-13 and otherwise described herein) can be implemented.

The processing platform 1400 in this embodiment comprises a plurality of processing devices, denoted 1402-1, 1402-2, 1402-3, . . . 1402-N, which communicate with one another over network(s) 1404. It is to be appreciated that the methodologies described herein may be executed in one such processing device 1402, or executed in a distributed manner across two or more such processing devices 1402. It is to be further appreciated that a server, a client device, a computing device or any other processing platform element may be viewed as an example of what is more generally referred to herein as a "processing device." As illustrated in FIG. 14, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 1402 shown in FIG. 14. The network(s) 1404 represent one or more communications networks that enable components to communicate and to transfer data therebetween, as well as to perform other functionalities described herein.

The processing device 1402-1 in the processing platform 1400 comprises a processor 1410 coupled to a memory 1412. The processor 1410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1410. Memory 1412 (or other storage device)

having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1412 may comprise electronic memory such as random-access memory (RAM), read-only memory (ROM) or other types of memory, in any combination. The one or more software programs when executed by a processing device such as the processing device 1402-1 causes the device to perform functions associated with one or more of the components/steps of system/methodologies in FIGS. 1-13. One skilled in the art would be readily able to implement such software given the teachings provided herein. Other examples of processor-readable storage media embodying embodiments of the invention may include, for example, optical or magnetic disks.

Processing device 1402-1 also includes network interface circuitry 1414, which is used to interface the device with the networks 1404 and other system components. Such circuitry may comprise conventional transceivers of a type well known in the art.

The other processing devices 1402 (1402-2, 1402-3, . . . 1402-N) of the processing platform 1400 are assumed to be configured in a manner similar to that shown for computing device 1402-1 in the figure.

The processing platform 1400 shown in FIG. 14 may comprise additional known components such as batch processing systems, parallel processing systems, physical machines, virtual machines, virtual switches, storage volumes, etc. Again, the particular processing platform shown in this figure is presented by way of example only, and the system shown as 1400 in FIG. 14 may include additional or alternative processing platforms, as well as numerous distinct processing platforms in any combination.

Also, numerous other arrangements of servers, clients, computers, storage devices or other components are possible in processing platform 1400. Such components can communicate with other elements of the processing platform 1400 over any type of network, such as a wide area network (WAN), a local area network (LAN), a satellite network, a telephone or cable network, or various portions or combinations of these and other types of networks.

Furthermore, it is to be appreciated that the processing platform 1400 of FIG. 14 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers. As illustratively used herein, a container is considered a "virtual computing element" (e.g., unit of software) that packages application code and its dependencies so that the application is executed quickly and reliably from one computing environment to another. A Docker container image is a lightweight, standalone, executable package of software that includes all components needed to execute an application.

The particular processing operations and other system functionality described in conjunction with FIGS. 1-13 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
  at least one processing platform comprising one or more processing devices;
  the at least one processing platform being configured to:
    automatically analyze one or more incremental code changes in a computer program;
    identify one or more relevant regression test cases associated with one or more impacted areas of the computer program based on the one or more incremental code changes;
    at least one of automatically modify and create one or more regression test cases in a set of one or more regression tests for the computer program based on the automatic analysis and the identified one or more relevant regression test cases associated with the one or more impacted areas of the computer;

at least one of automatically modify and create one or more code flow paths corresponding to the one or more regression test cases in the set of one or more regression tests; and generate one or more visualizations based at least in part on the one or more code flow paths corresponding to the one or more regression test cases.

2. The apparatus of claim 1, wherein the at least one memory and the computer program code are further configured to, with the at least one processing platform, execute at least a portion of the set of one or more regression tests.

3. The apparatus of claim 1, wherein at least one of automatically modifying and creating a set of one or more regression tests for the computer program based on the automatic analysis further comprises appending one or more new regression tests to the set.

4. The apparatus of claim 1, wherein at least one of automatically modifying and creating a set of one or more regression tests for the computer program based on the automatic analysis further comprises deleting one or more existing regression tests from the set.

5. The apparatus of claim 1, wherein the one or more incremental code changes is automatically detected with a regression discovery engine, the regression discovery engine comprising logic configured to incrementally and dynamically perform the at least one of modifying and creating a set of one or more regression tests each time the one or more incremental code changes is detected.

6. The apparatus of claim 1, wherein the one or more incremental code changes comprises a first set of the one or more incremental code changes and a second set of the one or more incremental code changes.

7. The apparatus of claim 1, wherein the one or more visualizations comprise one or more graphs.

8. A method comprising:

automatically analyzing one or more incremental code changes in a computer program;

identifying one or more relevant regression test cases associated with one or more impacted areas of the computer program based on the one or more incremental code changes;

at least one of automatically modifying and creating one or more regression test cases in a set of one or more regression tests for the computer program based on the automatic analysis and the identified one or more relevant regression test cases associated with the one or more impacted areas of the computer program;

at least one of automatically modifying and creating one or more code flow paths corresponding to the one or more regression test cases in the set of one or more regression tests; and generating one or more visualizations based at least in part on the one or more code flow paths corresponding to the one or more regression test cases;

wherein the steps are performed by at least one processing platform comprising one or more processing devices.

9. The method of claim 8, further comprising executing at least a portion of the set of one or more regression tests.

10. The method of claim 8, wherein at least one of modifying and creating a set of one or more regression tests for the computer program based on the automatic analysis further comprises appending one or more new regression tests to the set.

11. The method of claim 8, wherein at least one of modifying and creating a set of one or more regression tests for the computer program based on the automatic analysis further comprises deleting one or more existing regression tests from the set.

12. The method of claim 8, wherein the one or more incremental code changes is automatically detected with a regression discovery engine, the regression discovery engine comprising logic configured to incrementally and dynamically perform the at least one of modifying and creating a set of one or more regression tests each time the one or more incremental code changes is detected.

13. The method of claim 8, wherein the one or more visualizations comprise one or more graphs.

14. The method of claim 8, wherein the one or more incremental code changes comprises a first set of the one or more incremental code changes and a second set of the one or more incremental code changes.

15. An article of manufacture comprising a non-transitory processor-readable storage medium having stored therein program code of one or more software programs, wherein the program code when executed by at least one processing device causes the at least one processing device to perform steps of:

automatically analyze one or more incremental code changes in a computer program;

identify one or more relevant regression test cases associated with one or more impacted areas of the computer program based on the one or more incremental code changes;

at least one of automatically modify and create one or more regression test cases in a set of one or more regression tests for the computer program based on the automatic analysis and the identified one or more relevant regression test cases associated with the one or more impacted areas of the computer program;

at least one of automatically modify and create one or more code flow paths corresponding to the one or more regression test cases in the set of one or more regression tests; and generate one or more visualization based at least in part on the one or more code flow paths corresponding to the one or more regression test cases.

16. The article of claim 15, further comprising executing at least a portion of the set of one or more regression tests.

17. The article of claim 15, wherein the one or more incremental code changes is automatically detected with a regression discovery engine, the regression discovery engine comprising logic configured to incrementally and dynamically perform the at least one of modifying and creating a set of one or more regression tests each time the one or more incremental code changes is detected.

18. The article of claim 15, wherein at least one of automatically modifying and creating a set of one or more regression tests for the computer program based on the automatic analysis further comprises appending one or more new regression tests to the set.

19. The article of claim 15, wherein the one or more visualizations comprise one or more graphs.

20. The article of claim 15, wherein at least one of modifying and creating a set of one or more regression tests for the computer program based on the automatic analysis further comprises deleting one or more existing regression tests from the set.

* * * * *